United States Patent [19]

Landis et al.

[11] Patent Number: 4,672,997

[45] Date of Patent: Jun. 16, 1987

[54] MODULAR, SELF-DIAGNOSTIC MASS-FLOW CONTROLLER AND SYSTEM

[75] Inventors: Donald Landis, Hollis, N.H.; John H. Fabricius, Westford, Mass.

[73] Assignee: BTU Engineering Corporation, North Billerica, Mass.

[21] Appl. No.: 665,929

[22] Filed: Oct. 29, 1984

[51] Int. Cl.⁴ ............................................. G01F 1/68
[52] U.S. Cl. ..................... 137/554; 73/204; 340/606
[58] Field of Search ............... 137/486, 554; 73/204; 340/606, 626, 632, 656

[56] References Cited

U.S. PATENT DOCUMENTS

| | | | |
|---|---|---|---|
| 2,895,502 | 7/1959 | Roper et al. | 137/486 |
| 2,917,066 | 12/1959 | Bergson | 137/486 |
| 3,543,578 | 12/1970 | Sampson | 73/204 |
| 3,776,249 | 12/1973 | Wailes et al. | 137/486 |
| 3,851,526 | 12/1974 | Drexel | 73/202 |
| 3,931,736 | 1/1976 | Olmstead | 73/204 |
| 3,938,384 | 12/1976 | Blair | 73/204 |
| 3,992,940 | 11/1976 | Platzer, Jr. | 73/204 |
| 4,080,821 | 3/1978 | Johnston | 73/204 |
| 4,135,396 | 1/1979 | Stunke et al. | 73/204 |
| 4,142,170 | 2/1979 | Blatter | 73/204 |
| 4,213,335 | 7/1980 | Peter et al. | 73/204 |
| 4,255,968 | 3/1981 | Harpster | 73/204 |
| 4,306,453 | 12/1981 | Wolfshörndl | 73/204 |
| 4,319,483 | 3/1982 | Durham, Jr. et al. | 73/204 |
| 4,320,655 | 3/1982 | Kammer-maier et al. | 73/204 |
| 4,480,467 | 11/1984 | Harter et al. | 340/606 |
| 4,487,213 | 12/1984 | Gates et al. | 137/486 |

*Primary Examiner*—A. Michael Chambers
*Attorney, Agent, or Firm*—Weingarten, Schurgin, Gagnebin & Hayes

[57] ABSTRACT

A modular, self-diagnostic mass-flow controller and system includes separable and readily interchangeable housing portions cooperative to provide mass-flow controller component repair and replacement without further system disconnection. The mass-flow controller includes dual mass-flow sensors and associated electronics including a processor operative in response to the dual mass-flow sensor and other signals to both provide mass-flow control of a controlled gas and self-diagnostics to ensure that the controller is operating in its intended manner.

18 Claims, 6 Drawing Figures

MODULAR, SELF-DIAGNOSTIC MASS-FLOW CONTROLLER AND SYSTEM

FIELD OF THE INVENTION

This invention is directed to the field of mass-flow controllers, and more particularly, to a novel modular, self-diagnostic mass-flow controller and system.

BACKGROUND OF THE INVENTION

In many applications including the formation of intended thin-film on semiconductor substrates in a chemical vapor deposition (CVD) furnace, it is often desirable to control the quantity (i.e. mass) of gas flow of a preselected gas per unit time to a gas utilization device, such as the CVD furnance. A heretofore known mass-flow controller employed for such a purpose includes a monolithic cylindrical steel housing having a central bore defining a longitudinally extending fluid-flow conduit. A flow restrictor is transversely positioned in the central bore and intermediate the ends of the cylindrical housing for both providing a pressure head and for limiting the fluid-flow to within prescribed bounds therethrough. A pressure sensing tube responsive to the pressure head is externally mounted to the housing with one of its ends opening to the central bore and upstream of the flow restrictor, and with the other of its ends opening to the central bore and downstream of the flow restrictor. A heating coil is centrally provided around the sensing tube for heating the gas that flows therethrough, and upstream and downstream temperature sensing coils (RTD's) are provided around the sensing tube to respective sides of the heating coil.

The mass of the gas that flows in the sensing tube absorbs the heat produced by the heating coil, and in such a way that the quantity of heat absorbed therefrom uniquely depends upon the specific heat of the individual gas to be mass-flow controlled. The difference in temperature thus sensed by the upstream and the downstream temperature sensing coils is representative of mass-flow rate in the sensing tube, which is proportional by a known proportionality constant to the mass-flow rate in the longitudinally extending fluid-flow conduit of the cylindrical housing of the mass-flow controller.

The heretofore known mass-flow controllers however, among other disadvantages, must be individually calibrated for each gas to be mass-flow controlled, and for a particular range of flow rate for each such gas, necessitating an undesirably large inventory of, and associated cost for, individual mass-flow controllers respectively dedicated to a particular gas and range of flow-rate. Furthermore, contaminants present in the controlled gas and on the walls of both the sensing tube and the housing of the mass-flow controller commonly build-up and occlude not only the sensing tube but also the flow restrictor shifting the proportionality constant and therewith producing undersirable mass-flow control error. Moreover, the replacement and repair of an occluded sensing tube and/or flow restrictor necessitate the disconnection of the heretofore known mass-flow controller, resulting in considerable down-time with consequent labor cost, replacement cost, and lost system throughput revenue.

SUMMARY OF THE INVENTION

The present invention contemplates a mass-flow controller having a modular housing having mating housing portions cooperative to allow the expeditious removal and replacement both of possibly occluded flow restrictors and sensing tubes in a manner neither requiring system disconnection nor prolonged and undesirable system down-time. The present invention further contemplates a mass-flow controller operative to detect occlusions in the sensing tubes and flow restrictors, to detect downstream occlusions, to detect conditions of no-gas and no-flow, and to actuate, as appropriate, suitable alarms and/or controller operative for any one of plural gases, and over plural ranges of gas flow rate for each of the several gases.

The mass-flow controller of the present invention includes first and second housing portions cooperative to provide a longitudinally extending fluid-flow passageway. First and second sensing tubes are mounted to the housing and in fluid communication with the longitudinally extending passageway that respectively includes means operative to provide first and second sensor signals indicative of mass-flow rate along the fluid-flow passageway. The housing includes a flat surface extending along a portion of the longitudinally extending fluid-flow passageway, and first and second flow restrictors are removably disposed on the flat surface individually in series with the longitudinally extending fluid-flow passageway and respectively in parallel with corresponding ones of the sensing tubes. The modular housing is readily separable, and both provides ease of flow restrictor removal and replacement without requiring further system disconnection, and provides occluded sensing tube removal and replacement by cleaned or new sensing tubes, again without requiring further system disconnection.

The mass-flow controller of the present invention includes a processor operative in response to a predetermined combination of the first and the second sensor signals for providing a control valve signal that establishes and maintains an intended mass-flow rate along the fluid-flow passageway. The processor is operative in response to the first and second sensor signals alone, and in a predetermined combination, for providing self-diagnostic alarm signals representive of various operating condition of the controller. The first and second signals indicative of mass-flow rate of the mass-flow controller of the present invention help provide fail-safe control action. The processor is operative in response to the first and second sensor signals to provide such self-diagnostics as an occlusion condition either in the flow restrictors or in the sensing tubes, and such failure conditions as a gas leakage, as no-gas being supplied, as a sensing-tube failure, and as a control valve failure. A pressure sensor is mounted to the housing for providing a signal indicative of gas pressure in the fluid-flow passageway, and the processor is further operative in response to the pressure signal to provide such self-diagnostics as a no-flow condition, a plugged fluid-flow channel condition, and a downstream occlusion condition.

In an exemplary embodiment, the modular mass-flow controller is advantageously utilized in a gas control system having an input purge manifold and an input gas port, and having an output scavenger manifold and an output gas port. Upstream and downstream processor-controlled valves connected to the processor and the inputs and outputs are selectably operable to control the gas flow from the gas input port to the gas output port, from the gas input port to the output scavenger manifold, from the input purge manifold to the gas outlet port, and from the input purge manifold to the scavenger output manifold. The mass-flow controller system in the illustrated embodiment can purge the mass-flow controller of gas, purge an output utilization device of gas, maintain a continuous gas flow through the controller, provide continuous self-diagnostics, stabilize the controller prior to use, and mix two or more gases controllably, among other things.

BRIEF DESCRIPTION OF THE DRAWINGS

These and other features and attendant advantages of the present invention will become apparent as the invention becomes better understood by referring to the following solely exemplary and non-limiting detailed description of the preferred embodiments, and to the drawings, wherein.

DETAILED DESCRIPTION OF THE INVENTION

Figure 1:
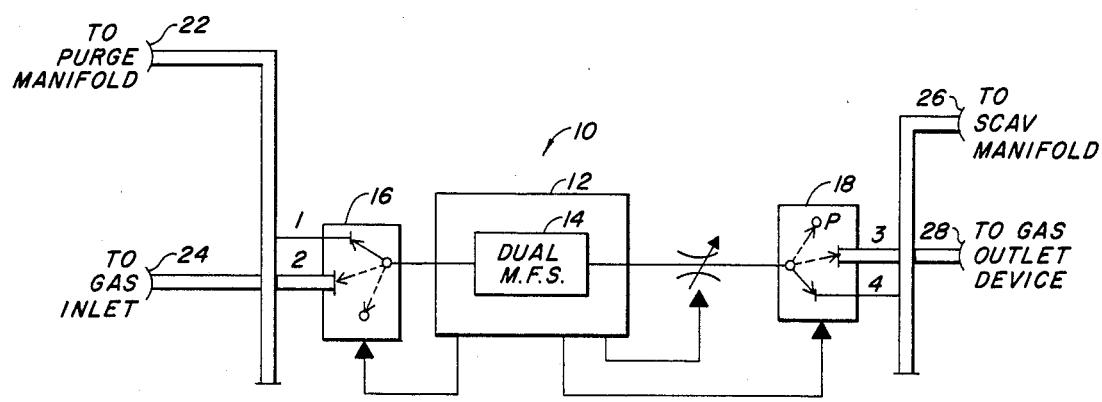
FIG. 1 is a block diagram of a modular, self-diagnostic mass-flow controller and system according to the present invention.

Referring now to FIG. 1, generally designated at 10 is a block diagram of the novel modular, self-diagnostic mass-flow controller and system according to the present invention. The system 10 includes a modular, self-diagnostic mass-flow controller generally designated 12 to be described having a dual mass-flow sensor 14 to be described. The controller 12 is connected to and controls the state of an input valve generally designated 16 upstream of the controller 12, and is connected to and controls the state of an output valve generally designated 18 downstream of the controller 12. A control valve 20 connected to the controller 12 is operative to provide an intended mass-flow rate.

A source of purge gas 22 is connected to one input designated "1" of the valve 16. A source of input gas 24 to be controlled is connected to another input designated "2" of the valve 16. A scavenger manifold 26 is connected to one output designated "3" of the valve 18. A gas utilization outlet 28 is connected to another output designated "4" of the valve 18. A gas utilization device, not shown, is connected to the gas outlet 28, and may be, for example, a CVD furnace operative to deposit an intended thin-film on semiconductor substrates.

The mass-flow controller 12 is selectively operable to connect the purge manifold 22 to the scavenger manifold 26 by appropriate actuation of the valves 16, 18. In this case, the controller 12 is operative to purge itself either to expel any undesirable residual gas therein to the scavenger manifold, or to provide a continuous flow through the controller to provide a continuous check on its own operation, among other things.

The mass-flow controller 12 is selectively operable to connect the purge manifold 22 to the gas outlet 28 by appropriate actuation of the valves 16, 18. In this case, the controller 12 is operative to purge the gas utilization device connected to the gas outlet 28 of any undesirable residual gases contained therein, among other things.

The mass-flow controller 12 is selectively operable to connect the gas inlet 24 to the scavenger manifold 26 by appropriate actuation of the valves 16, 18. In this case, the controller 12 is operative to direct inlet gas to the scavenger manifold useful, for example, to stabilize the controller prior to its connection to the gas outlet 28 to accomodate a change either of range of flow-rate or of gas type, among other things.

The mass-flow controller 12 is selectively operable to connect the gas inlet 24 to the gas outlet 28 by appropriate actuation of the valves 16, 18. In this case, the controller 12 is operative to direct inlet gas 24 to the gas outlet 28 for use by the gas utilization device, among other things.

The mass-flow controller 12 is selectively operable to sequentially switch between the purge manifold 22 and the gas inlet 24 at preselected times and for preselected duratons by appropriate actuation of the inputs of valve 16. In this case, the controller 12 is operative to controllably mix input gases, among other things. Each of the valves 16, 18 includes an "off" position selectable by the mass-flow controller 12.

Figure 2:
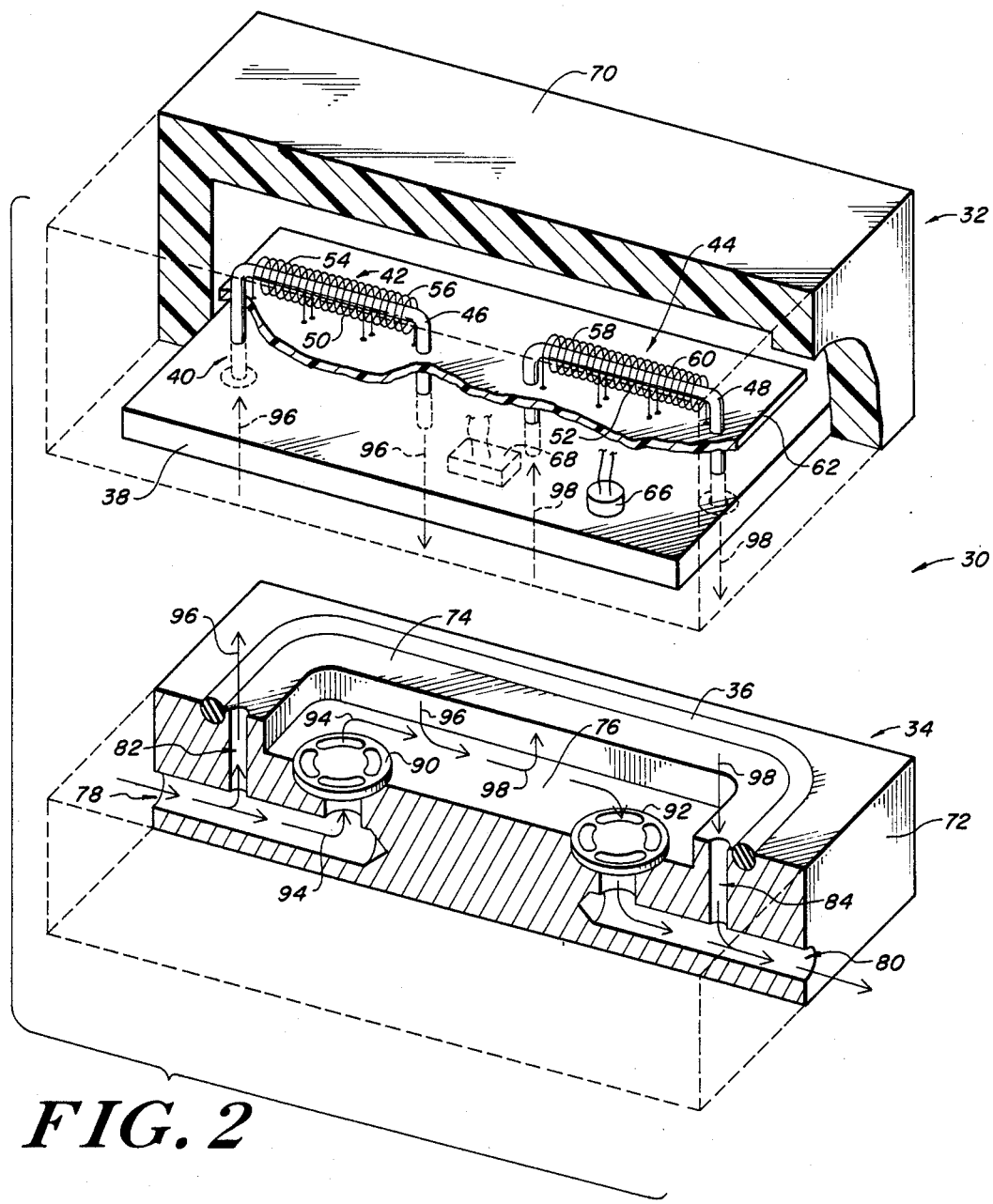
FIG. 2 is an exploded, partially sectioned and broken-away perspective view of the modular, self-diagnostic mass-flow controller according to the present invention.
Figure 3:
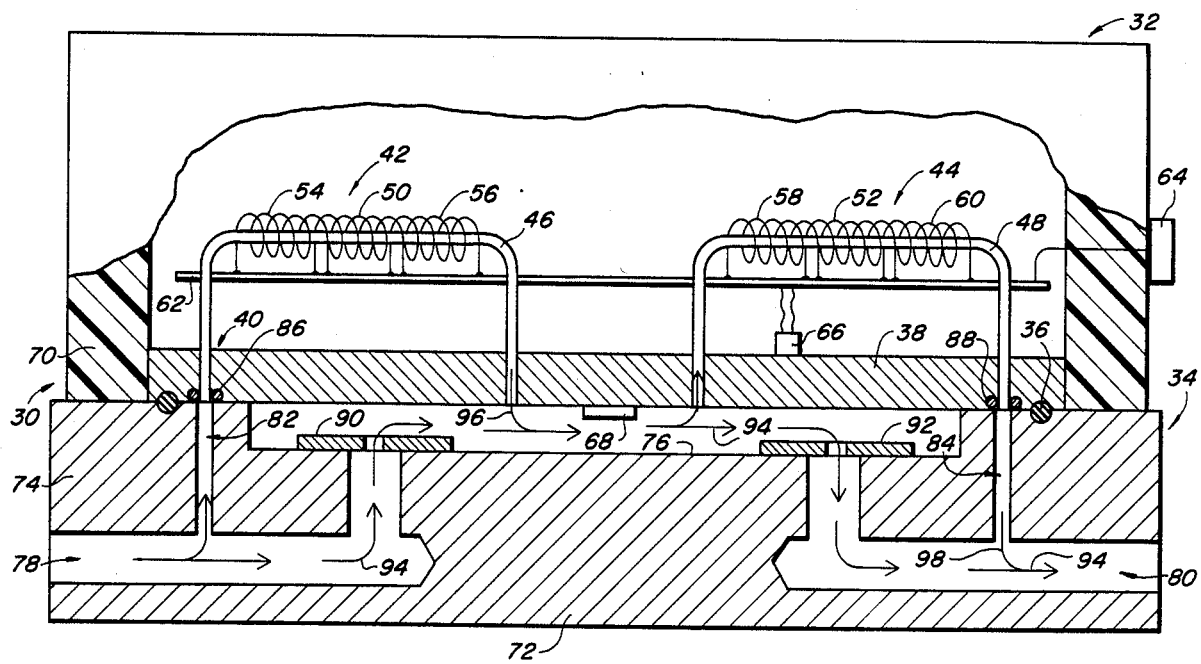
FIG. 3 is a partially broken-away sectional view of the modular, self-diagnostic mass-flow controller according to the present invention.

Referring now to FIGS. 2 and 3, generally designated at 30 is the modular, self-diagnostic mass-flow controller according to the present invention. The controller 30 includes a first housing portion generally designated 32 that is removably fastened in air-tight sealing engagement to a second housing portion generally designated 34 via a sealing ring 36.

The first housing portion 32 of the controller 30 includes a plate 38 having a plurality of spaced sensing tube receiving apertures generally designated 40 transversely extending therethrough. First and second mass-flow sensors generally designated 42, 44 having sensing tubes 46, 48 are mounted to the first housing portion 32 with respective ends of the sensing tubes 46, 48 received in corresponding ones of the transversely extending sensing tube receiving apertures 40. A heating coil 50 is centrally disposed around the sensing tube 46, and a heating coil 52 is centrally disposed around the sensing tube 48. Resistive thermal sensing coils (RTD's) 54, 56 are disposed around the sensing tube 46, and to respective sides of the central heating coil 50, and resistive thermal sensing coils (RTD's) 58, 60 are disposed around the sensing tube 48, and to respective sides of the central heating coil 52. A printed circuit or other interconnection board 62 is mounted to the housing portion 32. The board 62 is in electrical communication with external circuitry, not shown, via a connector 64 as illustrated in FIG. 3. A temperature sensor 66 is mounted to the housing 32 for providing a signal indication of the temperature of the plate 38. A pressure sensor 68 is mounted the housing 32 for providing a signal indication of the pressure of the gas flows through the controller 30. An encapsulent 70 is provided around the sensing tubes 46, 48, and the interconnection board 62, of the first housing portion 32 of the controller 30.

The second housing portion 34 of the controller 30 includes a base 72 having an upstanding peripheral flange 74 defining a flat surfaced recess 76. The base 72 includes an input flow channel generally designated 78 that extends through a portion of the base 72 and upwardly into communication with the flat surfaced recess 76, and includes a spaced-apart output flow channel generally designated 80 that extends through another portion of the base 72 and upwardly into communication with the flat surfaced recess 76. The peripheral upstanding flange 74 and subjacent portions of the base 72 include a transversely extending sensing tube feed passageway generally designated 82 in communication with the input flow channel 78, and a transversely extending sensing tube feed passageway generally designated 84 in communication with the output flow channel 80. The passageways 82, 84 are respectively sealed in fluid communication with corresponding ones of the sensing tubes 46, 48 via O-rings 86, 88 illustrated in FIG. 3. A flow restrictor 90 is removable mounted to the flat surfaced recess 76 of the housing portion 34 transversely across the input flow channel 78, and a flow restrictor 92 is removably mounted to the flat surfaced recess 76 transversely across the output flow channel 80.

The housing portions 32, 34 are cooperative to provide a primary fluid-flow passageway as illustrated by the arrows 94 through the members 78, 76, and 80 of the controller 30. Gas to be mass-flow controlled coupled to the input flow channel 78 flows therethrough to the central flat surfaced recess 76, and out therefrom through the output flow channel 80 to a selected gas utilization device, not illustrated, operatively coupled to the right of the figures. The restrictor 90 develops a pressure head along the flow path 94, which directs a small portion of the gas to be mass-flow controlled through the transversely extending aperture 82 into the mass-flow sensor 42 and back therefrom to the central flat surfaced recess 76 as illustrated by arrows 96. The flow restrictor 92 develops a pressure head along the flow path 94, which directs a small portion of the gas to be mass-flow controlled through the sensing tube 48 of the mass-flow sensor 44 and back therefrom to the output flow channel 80 as illustrated by the arrows 98. The mass-flow sensors 42, 44 each provide a control signal indication of mass-flow rate through the respective sensing tubes 46, 48 that are each proportional by a predetermined proportionality constant to the mass-flow rate through the flow path 94 of the controller 30.

Figure 4:
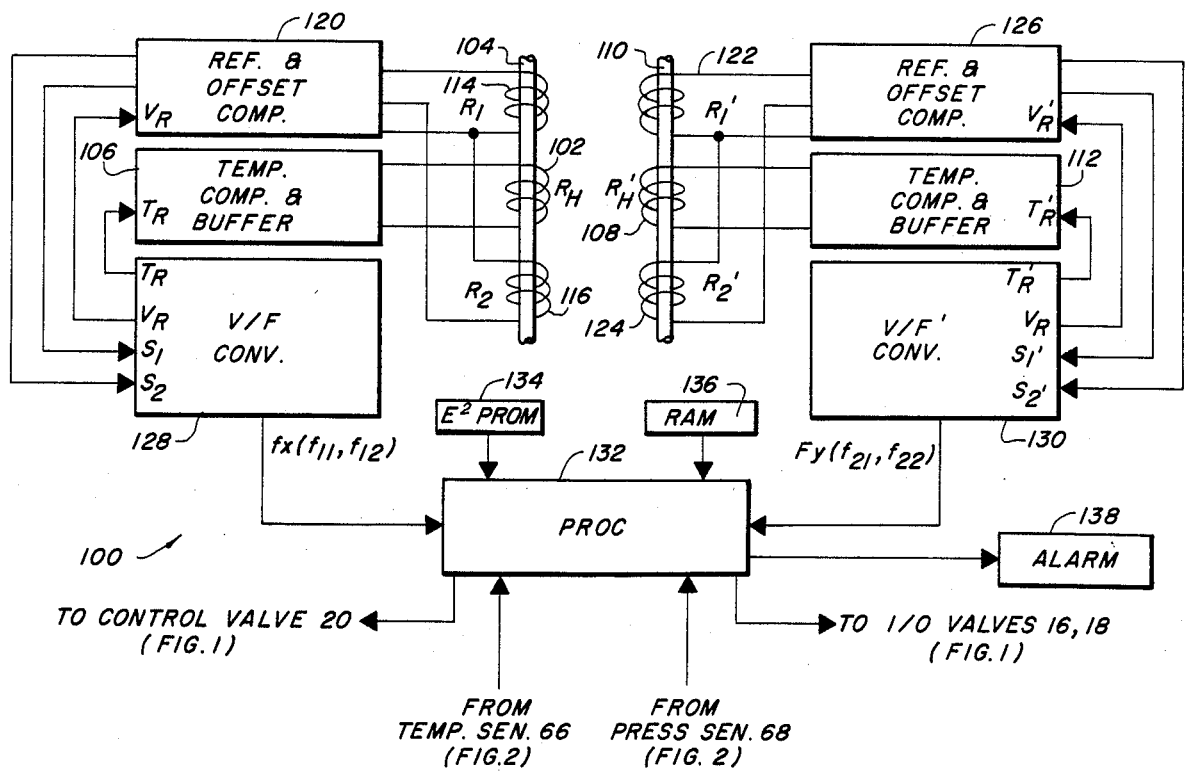
FIG. 4 is a schematic diagram of the electronics of the modular, self-diagnostic mass-flow controller according to the present invention.

Referring now to FIG. 4, generally designated at 100 is a schematic circuit diagram of the modular, self-diagnostic mass-flow controller according to the present invention. A heating coil 102 designated "$R_H$" is wrapped centrally around a sensing tube 104 and electrically connected to the output of a temperature comparator and buffer 106. A heating coil 108 designated "$R_H'$" is wrapped centrally around a sensing tube 110 and electrically connected to the output of a temperature comparator and buffer 112. Resistive thermal sensing coils 114, 116 designated "R1, R2" are wrapped around the sensing tube 104 respectively to each side of the coil 102, and electrically connected differentially to the input of a reference and offset comparator 120. Resistive thermal sensing coils 122, 124 designated "R1', R2'" are wrapped around the sensing tube 110 respectively to each side of the heating coil 108, and electrically connected differentially to the input of a reference and offset comparator 126.

A voltage to frequency convertor 128 designated "V/F CONV" is connected to the output designated "$S_1, S_2$" of the reference and offset comparator 120, to the reference input designated "$T_R$" of the temperature comparator and buffer 106, and to the reference input designated "$V_R$" of the reference and offset comparator 120. A voltage to frequency convertor 130 designated "V/F CONV'" is connected to the output designated "$S_1', S_2'$" of the reference and offset comparator 126, to the reference input designated "$T_R'$" of the temperature comparator and buffer 112, to the reference input designated "$V_R'$" of the reference and offset comparator 126. The voltage to frequency convertors 128, 130 preferably are Analog Devices chip number 537, which include on-chip a voltage to frequency convertor module, a temperature sensor module, and a voltage reference module. Preferably, the inputs designated "$V_R, T_R$" and "$V_R', T_R'$" of the comparators 120, 106, 126, 112 are connected to the on-chip voltage reference modules of the voltage to frequency converters 128, 130, and the outputs designated "$S_1, S_2$" and "$S_1', S_2'$" of the comparators 120, 126 are connected to the on-chip voltage to frequency converter modules thereof.

A processor 132 having an E²PROM 134 and a scratch pad RAM 136 associated therewith in the usual manner is connected to the signal outputs designated "$F_X(f_{11}, f_{12})$", "$F_Y(f_{21}, f_{22})$" of the voltage to frequency converters 128, 130. The processor 132 has an input connected to the temperature sensor 66 (FIG. 2), and has an input connected to the pressure sensor 68 (FIG. 2). The temperature sensor 66 (FIG. 2) may advantageously be the on-chip temperature sensor module of either one of the voltage to frequency converters 128, 130. An alarm 138 is connected to an output of the processor 132. The input/output valves 16, 18 (FIG. 1) are connected to outputs of the processor 132, and the control valve 20 (FIG. 1) is connected to an output of the processor 132.

In operation, the coils "$R_1, R_2$" and "$R_1', R_2'$" change in resistance as mass-flow rate changes through the sensing tubes in a well-known manner as described above in the background of the invention. The reference and offset comparators 120, 126 produce the signals designated "$S_1, S_2$" and "$S_1', S_2'$" in response thereto, whose levels respectively correspond to the resistance changes of the coils "$R_1, R_2$" and "$R_1', R_2'$". The voltage to frequency converters 128, 130 are responsive to the signals "$S_1, S_2$" and "$S_1', S_2'$", and are operative to produce the signals designated "$f_{11}, f_{12}$" and "$f_{21}, f_{22}$" whose frequencies respectively correspond thereto. The processor is then operative to compute the frequency signals designated "$F_X, F_Y$" to be described for each of the frequency pairs "$f_{11}, f_{12}$" and "$f_{21}, f_{22}$" that are respectively representative of mass-flow rate through the sensing tubes 104, 110.

Figure 5:
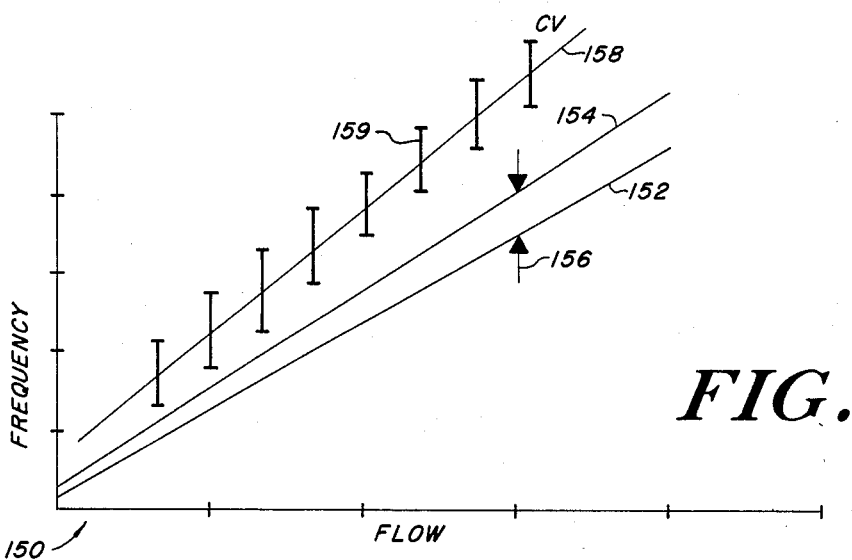
FIG. 5 is a graph useful in illustrating the operation of the modular, self-diagnostic mass-flow controller according to the present invention.

Referring now to FIG. 5, generally designated at 150 is a graph in Cartesian coordinates depicting frequency as the ordinate and mass-flow rate as the abscissa. As shown by a line 152, the frequencies "$F_X(f_{11}, f_{12})$" produced by the voltage to frequency converter 128 (FIG. 4) each correspond to a unique mass-flow rate through the mass-flow controller as sensed by the sensing tube 104 (FIG. 4). As shown by a line 154, the frequencies "$F_Y(f_{21}, f_{22})$" produced by the voltage to frequency convertor 130 (FIG. 4) each correspond to a unique mass-flow rate through the mass-flow controller as sensed by the sensing tube 110 (FIG. 4). For each mass-flow rate as illustrated by the arrows 156, a characteristic difference frequency signal designated "$\Delta F$" is defined by the absolute value of the difference of the ordinates of the two curves 152, 154 for each such mass-flow rate point. The signal "ΔF" is useful during controller self-diagnosis to be described to provide an alarm indication of occluded mass-flow controller components, among other things. As shown by a line 158, for each characteristic difference frequency signal there exists a corresponding control valve frequency signal designated "CV", which, when applied by the processor to the control valve 20 (FIG. 1), selects that control valve aperture to establish and maintain an intended mass-flow rate through the mass-flow controller. As shown by bars 159, a band of possible values of the control valve frequency signal exists for each mass-flow rate. The band of frequencies is useful in self-diagnostics to identify out-of-bound conditions and potential system errors as appears more fully below.

Figure 6:
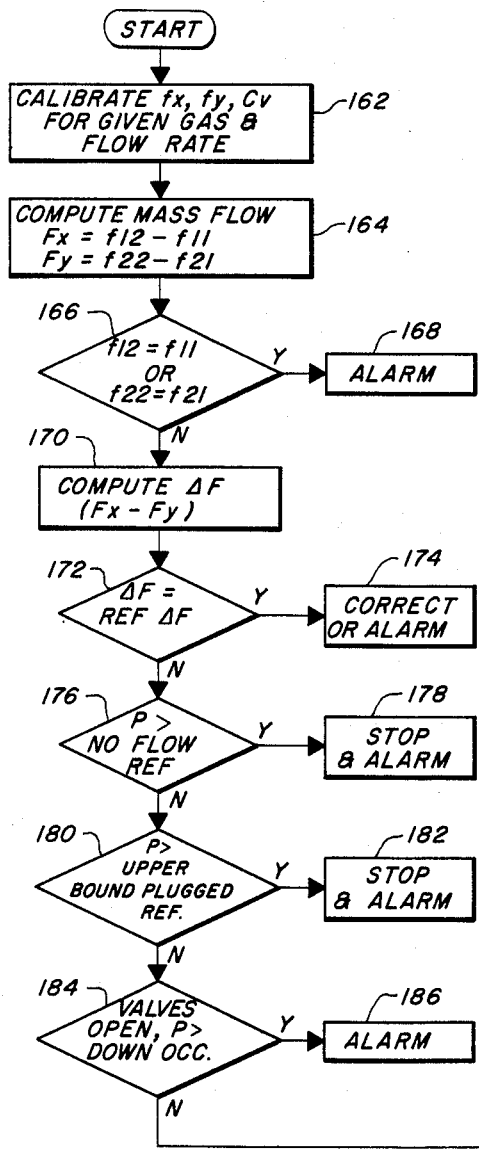
FIG. 6 is a processor flow chart of the modular, self-diagnostic mass-flow controller according to the present invention.
Figure 6:
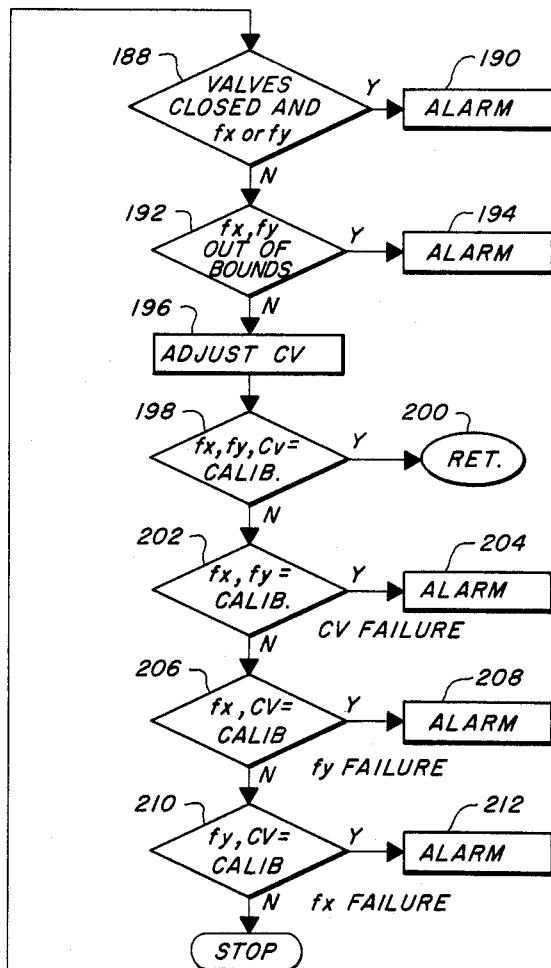

Referring now to FIG. 6, generally designated at 160 is a flow chart useful in illustrating the operation of the processor 132 (FIG. 4) of the modular, self-diagnostic mass-flow controller according to the present invention.

As illustrated by a block 162, a calibrated gas source is coupled to the mass-flow controller during initialization. The calibrated gas source is stepped through the intended range of flow-rate for the given gas, and the corresponding values of "$F_X$" and "$F_Y$" of the mass-flow controller, and their corresponding characteristic difference frequency "ΔF", are written in processor memory. The processor is then operative to step through each value of "$F_X, F_Y$" and to write the corresponding control valve frequency "CV" for each mass-flow rate into processor memory.

As shown by a block 164, the processor is then operative to compute the mass-flow "$F_X, F_Y$" through the controller as sensed by each of the mass-flow sensing tubes 104, 110 (FIG. 4) by taking the absolute value of the mathematical difference of the signal pairs "$f_{11}, f_{12}$" and "$f_{21}, f_{22}$" produced by corresponding ones of the resistive thermal sensing coils "$R_1, R_2$" and "$R_1', R_2'$" on respective sensing tubes, and multiplying by a predetermined proportionality factor stored in processor memory.

As shown by a block 166, the processor is operative to determine whether the signals "$f_{11}, F_{12}$" and "$f_{21}, f_{22}$" (FIG. 4) produced by individual ones of the resistive thermal sensing coils "$R_1, R_2$" and "$R_1', R_2'$" (FIG. 4) on corresponding ones of the mass-flow sensing tubes 104, 110 (FIG. 4) are equal. As shown by a block 168, if either pair of resistive thermal sensing coils produce singnals having equal magnitudes, the processor is operative to provide a plugged sensing tube alarm condition signal.

As shown by a block 170, the processor is then operative to compute "ΔF", the characteristic difference frequency representative of mass-flow rate through the controller is the signal pairs "$f_{11}, f_{12}$" and "$f_{21}, f_{22}$" are not equal.

As shown by a block 172, the processor is operative to determine whether the characteristic difference frequency signal is equal to a reference characteristic difference frequency standard stored in processor memory.

As shwon by a block 174, if the characteristic difference frequency signal is not equal to the reference characteristic difference frequency standard, the processor is operative to provide an occluded controller alarm condition signal. Drifting of the characteristic difference frequency from the reference characteristic difference frequency standard indicates occluded flow restrictors and/or mass-flow sensing tubes.

As shown by a block 176, the processor is then operative to compare the output of the pressure sensor 68 (FIG. 2) with a no-flow reference standard stored in processor memory. As shown by a block 166, if the pressure is less than the no-flow reference standard, the processor is operative to stop the mass-flow control process and to provide a no-flow alarm condition signal.

As shown by a block 180, the processor is operative to compare the output of the pressure sensor 68 (FIG. 2) to an upper bound plugged reference standard stored in processor memory. As shown by a block 182, if the pressure signal is greater than the upper bound plugged reference standard, the processor is operative to stop the mass-flow control process and to provide a plugged controller alarm condition signal.

As shown by a block 184, if the characteristic difference frequency signal is equal to the reference characteristic difference frequency standard and, if the I/O valves are open, the processor is operative to compare the pressure signal from the pressure transducer 68 (FIG. 2) to a downstream occlusion reference standard stored in processor memory. As shown by a block 186, whenever the pressure signal is greater than the downstream occlusion reference standard, the processor is operative to provide a downstream occlusion alarm condition signal.

As shown by a block 188, if the pressure signal is not greater than the downstream occlusion reference standard, and if the I/O valves are closed, the processor is operative to determine if the sensing tubes are producing signal indications "$F_X, F_Y$" of mass-flow rate through the controller. As shown by a block 190, if the I/O valves are closed and mass-flow is being sensed, the processor is operative to provide a controller leakage alarm condition signal.

As shown by a block 192, the processor is then operative to determine whether "$F_X, F_Y$" are out of calibration bounds stored in processor memory. As shown by a block 194, if "$F_X, F_Y$" are out of calibration bounds, the processor is operative to provide a controller malfunction alarm condition signal.

As shown by a block 196, if "$F_X, F_Y$" are within calibration bounds, the processor is operative to controllably adjust the control valve 20 (FIG. 1) to establish and maintain an intended mass-flow rate through the controller.

As shown by a block 198, the processor is then operative to determine whether "$F_X, F_Y$" and "CV" are within calibration bounds stored in processor memory. If these values are within calibration bounds, the processor is operative to return processing to the block 164 as shown by block 200. If these values are out of calibration bounds, the processor is operative to determine which variable isout of bounds.

As shown by a block 202, the processor is then operative to determine whether "$F_X, F_Y$" are within calibration bounds stored in processor memory. As shown by a block 204, if "$F_X, F_Y$" are within calibration, the processor is operative to provide a failed control valve alarm condition signal.

As shown by a block 206, the processor is operative to determine whether "$F_X$, CV" are within calibration bounds stored in processor memory. As shown by a block 208, if "$F_X$, CV" are within calibration, the processor is operative to provide a failed "$F_Y$" sensing tube alarm condition signal.

As shown by block 210, the processor is then operative to determine whether "F$_Y$, CV" are within calibration bounds stored in processor memory. As shown by a block 212, if "F$_Y$, CV" are within calibration, the processor is operative to provide a failed "F$_X$" sensing tube alarm condition signal.

It will be appreciated that many modifications of the presently disclosed invention will be apparent to those skilled in the art without departing from the scope of the appended claims.

What is claimed is:

1. A modular, self-diagnostic mass-flow controller for controlling the mass-flow of a controlled gas along a main gas flow path, comprising:
    first means for providing a first control signal proportional to mass-flow of the controlled gas along a first gas flow path parallel to said main gas flow path;
    second means of providing a second control signal proportional to mass-flow of the controlled gas along a second gas flow path parallel to said main gas flow path; and
    third means coupled to said first and to said second means for providing a third control signal in response to a preselected combination of said first and said second control signals for controlling the mass-flow of the controlled gas along said main gas flow path, and for providing a self-diagnostic alarm signal in response to a preselected characteristic of said first and said second control signals that indicates a operating state of the controller.

2. The invention of claim 1, wherein each of said first and said second control signals include third and fourth constituent signals, and wherein said self-diagnostic alarm signal is produced when the characteristic of said third and fourth constituent signals of each of said first and said second control signals is such that they have substantially the same magnitude.

3. The invention of claim 1, wherein said preselected combination is the difference of said first and of said second control signals.

4. The invention of claim 3, wherein said third means includes a processor having a memory having stored data defining a difference frequency reference standard, and wherein said self-diagnostic alarm signal is produced when the characteristic of said difference of said first and said second control signals is such that it is not equal to said difference frequency reference standard.

5. The invention of claim 1, wherein said third means includes a processor having a memory having stored data defining first and second reference signal standards, and wherein said self-diagnostic alarm signal is produced when the characteristic of said first and said second control signals is such that individual ones of said first and of said second control signals are different from respective ones of said first and said second reference signal standards.

6. The invention of claim 5, further including a control valve controlled by said third control signal, wherein said third means includes a processor having a memory having control valve reference standard data, and wherein said processor is operative to produce said self-diagnostic alarm signal in response to a preselected characteristic of said first control signal, of said second control signal, and of said third control signal.

7. The invention of claim 1, further including fourth means for providing a signal representative of gas pressure along the main gas flow path, wherein said third means includes a processor having a memory having reference pressure data, and wherein said third means is further operative to provide a self-diagnostic alarm signal when the characteristic of the pressure signal is such that it is larger than said reference pressure data.

8. The invention of claim 1, further including fourth means for providing a signal representative of pressure along the main fluid-flow path, wherein said third means includes a processor having a memory having reference pressure data, and wherein said third means is operative to provide a self-diagnostic alarm signal when the characteristic of the pressure signal is such that it is less than the reference pressure data.

9. The invention of claim 1, wherein said first and said second means each include a sensing tube that is serially connected in spaced-apart relation along said main gas flow path.

10. A modular, self-diagnostic mass-flow controller having a gas flow passageway, comprising:
    a housing having first and second removably attachable housing portions cooperative to define when attached a portion of the gas flow passageway, said first housing portion defining an exposed flow restrictor receiving surface when the housing is detached for providing expeditious flow restrictor placement, removal, and replacement;
    at least one flow restrictor removably positioned on the flow restrictor receiving surface in position to restrict flow along the gas-flow passageway; and
    first and second mass-flow sensors coupled to the housing for providing first and second signal indications of mass-flow along the gas flow passageway.

11. The invention of claim 10, wherein said first housing portion includes an integral peripheral flange defining said flow restrictor receiving surface.

12. The invention of claim 10, wherein said first and said second mass-flow sensors are connected in series along said gas flow passageway.

13. The invention of claim 10, wherein said second housing portion includes a plate, and wherein said first and said second sensors include first and second sensing tubes mounted to said plate and in communication with said gas flow passageway when said housing portions are attached.

14. The invention of claim 10, further including a control valve, and means coupled to said first and said second mass-flow sensors for controlling said control valve in response to said first and said second signals.

15. The invention of claim 14, further including means coupled to said first and said second sensors for providing self-diagnostic alarm signals in response to said first and said second signals.

16. A modular, self-diagnostic mass-flow controller, comprising:
    a two-part housing cooperative to define a fluid-flow passageway;
    means mounted to the housing for providing first and second signal indications proportional to mass-flow along the fluid-flow passageway;
    means responsive to said first and said second signal indication for providing a third signal representative of mass-flow along the fluid-flow passageway; and
    means including a memory having reference data and responsive to said first, second, and third signals for providing self-diagnostic alarm signals in dependence upon predetermined relations between said first, second, and third signals and said reference data.

17. The invention of claim 16, wherein said two-part housing includes a housing portion having an upstanding peripheral flange defining a flat recessed surface, and further including a flow restrictor removably mounted to said flat recessed surface.

18. The invention of claim 17, wherein said first and second signal indication providing means includes first and second mass-flow sensing tubes.

* * * * *

UNITED STATES PATENT AND TRADEMARK OFFICE
CERTIFICATE OF CORRECTION

PATENT NO. : 4,672,997  Sheet 1 of 2
DATED : June 16, 1987
INVENTOR(S) : Donald Landis; John H. Fabricius It is certified that error appears in the above-identified patent and that said Letters Patent is hereby corrected as shown below:

Column 1, line 62, "controller, resulting" should read --controller from its gas supply, and its replacement by a recalibrated mass-flow controller, resulting--

Column 2, line 10, "and/or controller" should read --and/or controlled valves. The present invention further contemplates a single mass-flow controller-- lines 18-19 "in-cludes" should read --in-clude-- line 44, "condition" should read --conditions--

Column 3, line 61, "CVD furnance" should read --CVD furnace--

Column 4, line 16, "accomodate" should read --accommodate--
line 60, "housing 32" should read --housing portion 32--
line 62, "mounted the" should read --mounted to the--
line 63, "gas flows" should read --gas that flows--

Column 5, line 18, "removable" should read --removably--

Column 6, line 9, "112, to" should read --112, and to--

Column 7, line 44, "$f_{11}, F_{12}$" should read --"$f_{11}, f_{12}$"-- line 50, "singnals" should read --signals--
line 56, "is the" should read --if the--

UNITED STATES PATENT AND TRADEMARK OFFICE
CERTIFICATE OF CORRECTION

PATENT NO. : 4,672,997                 Sheet 2 of 2

DATED       : June 16, 1987

INVENTOR(S) : Donald Landis; John H. Fabricius

It is certified that error appears in the above-identified patent and that said Letters Patent is hereby corrected as shown below:

Column 8, line 56,   "isout" should read --is out--

Column 9, line 19,   "means of" should read --means for-- line 31,   "a operating" should read --an operating--

Column 10, line 62,   "indication" should read --indications--

Signed and Sealed this

Thirteenth Day of September, 1988

Attest:

DONALD J. QUIGG

*Attesting Officer*            *Commissioner of Patents and Trademarks*